US009853742B1

(12) United States Patent
Radosevic et al.

(10) Patent No.: US 9,853,742 B1
(45) Date of Patent: Dec. 26, 2017

(54) SOFTWARE-DEFINED ACOUSTIC COMMUNICATIONS SYSTEM

(71) Applicant: The United States of America as represented by the Secretary of the Navy, Washington, DC (US)

(72) Inventors: Dusan Radosevic, San Diego, CA (US); Michael Pfetsch, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 343 days.

(21) Appl. No.: 14/696,222

(22) Filed: Apr. 24, 2015

Related U.S. Application Data
(60) Provisional application No. 61/985,532, filed on Apr. 29, 2014.

(51) Int. Cl.
*H04B 11/00* (2006.01)
(52) U.S. Cl.
CPC .................................... *H04B 11/00* (2013.01)
(58) Field of Classification Search
CPC ................................ G01S 7/006; H04B 11/00
See application file for complete search history.

(56) References Cited

U.S. PATENT DOCUMENTS

| 5,269,309 A * | 12/1993 | Fort ........................ G01H 5/00 600/447 |
| 2002/0098864 A1* | 7/2002 | Mukai .................. H04B 1/0003 455/552.1 |
| 2004/0030227 A1* | 2/2004 | Littrup ................. A61B 8/0825 600/300 |
| 2004/0105533 A1* | 6/2004 | Iseli ....................... G01V 1/003 379/106.01 |
| 2005/0159185 A1* | 7/2005 | Hiramatsu ........ H04W 72/1231 455/560 |

(Continued)

OTHER PUBLICATIONS

Li, Yu and Huang, Haining, "The design and experiment of a software-defined acoustic modem for underwater sensor network", OCEANS 2010 IEEE, Sydney, AU, pp. 1-4, 2010.

(Continued)

*Primary Examiner* — Hovhannes Baghdasaryan
(74) *Attorney, Agent, or Firm* — SPAWAR Systems Center Pacific; Kyle Eppele; Ryan J. Friedl

(57) ABSTRACT

A system includes at least one transducer, connected via a transceiver to a switch, configured to transmit signals into and receive signals from an operating environment, a first and a second amplifier connected to the switch, a first filter connected to the first amplifier and a second filter connected to the second amplifier, a digital-to-analog converter (DAC) connected to the first filter and an analog-to-digital converter (ADC) connected to second filter, a digital system connected to both the DAC and ADC, and a processor connected to the digital system. At least one of the digital system and the processor has a plurality of software modules stored therein. One of the software modules is configured to reconfigure the operating frequency of the digital system based upon the operating frequency of the transducer.

8 Claims, 7 Drawing Sheets

(56) References Cited

U.S. PATENT DOCUMENTS

| | | | | |
|---|---|---|---|---|
| 2005/0202842 | A1* | 9/2005 | Brobston | H04B 1/006 455/552.1 |
| 2006/0052124 | A1* | 3/2006 | Pottenger | H04B 1/0003 455/515 |
| 2007/0139253 | A1* | 6/2007 | Meyers | G01S 7/006 342/57 |
| 2007/0209865 | A1* | 9/2007 | Kokosalakis | H04B 13/00 181/0.5 |
| 2007/0243832 | A1* | 10/2007 | Park | H04B 1/006 455/73 |
| 2008/0279047 | A1* | 11/2008 | An | H04B 11/00 367/134 |
| 2009/0067289 | A1* | 3/2009 | Lee | H04B 11/00 367/87 |
| 2011/0098075 | A1* | 4/2011 | Bienas | H04W 12/00 455/517 |
| 2012/0171963 | A1* | 7/2012 | Tsfaty | H04B 11/00 455/41.3 |
| 2013/0064044 | A1* | 3/2013 | Carter | H04B 11/00 367/197 |
| 2013/0170659 | A1* | 7/2013 | Guanziroli | H04R 29/001 381/59 |

OTHER PUBLICATIONS

Gray, Andrew, et al., "Extended Abstract: Tradeoffs and design choices for a software defined acoustic modem: a case study", International Workshop on Underwater Networks, 2009.

Nowsheen, Nusrat, et al., "A high data-rate, software-defined underwater acoustic modem", OCEANS 2010 IEEE, Seattle, WA, pp. 1-5, 2010.

Gray, Andrew et al., "Extended Abstract: Tradeoffs and Design Choices for a Software Defined Acoustic Modern: A Case Study", 4th ACM International Workshop on Underwater Networks, Berkeley, CA, Nov. 3, 2009.

Li, Yu et al., "The design and experiment of a software-defined acoustic modem for underwater sensor network", IEEE OCEANS 2010, Sydney, pp. 1-4, May 24-27, 2010.

Nowsheen, Nusrat et al.. "A high data-rate, software-defined underwater acoustic modem", IEEE OCEANS 2010, Sydney, pp. 1-5, Sep. 20-23, 2010.

\* cited by examiner

SOFTWARE-DEFINED ACOUSTIC COMMUNICATIONS SYSTEM

CROSS-REFERENCE TO RELATED APPLICATIONS

This application claims the benefit of U.S. Provisional Patent Application Ser. No. 61/985,532 filed Apr. 29, 2014, entitled "Field-Programmable Software-Defined Acoustic Communications System", the content of which is fully incorporated by reference herein.

BACKGROUND

Hardware-defined or hard-wired acoustic systems are disadvantageous in that they must be physically redesigned and rebuilt when modifications are necessary. If a system is defined in software, then its modularity can be guaranteed by design. Such a system is desirable.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein describe a software-defined system that may be used to facilitate acoustic communications (ACOMMS). The embodiments allow for fully configurable parameters, such as operating frequency and modulation scheme, as well as configurable hardware. The embodiments enable rapid development of advanced technologies, modulation techniques, and coding schemes, including channel estimation and Doppler-correction schemes. The embodiments provide for signal processing that is entirely implemented in software, a wide operating frequency range (e.g. 10 KHz-250 KHz), multiple definable modulation schemes, low signal-to-noise ratio (SNR) (e.g. less than 15 dB), and high data throughput (e.g. greater than 10 kbps). The embodiments may also be used for terrestrial communication (over-the-air) by slight configuration changes, to include but not limited to change of the transducer for an antenna suitable for such communications.

Figure 1:
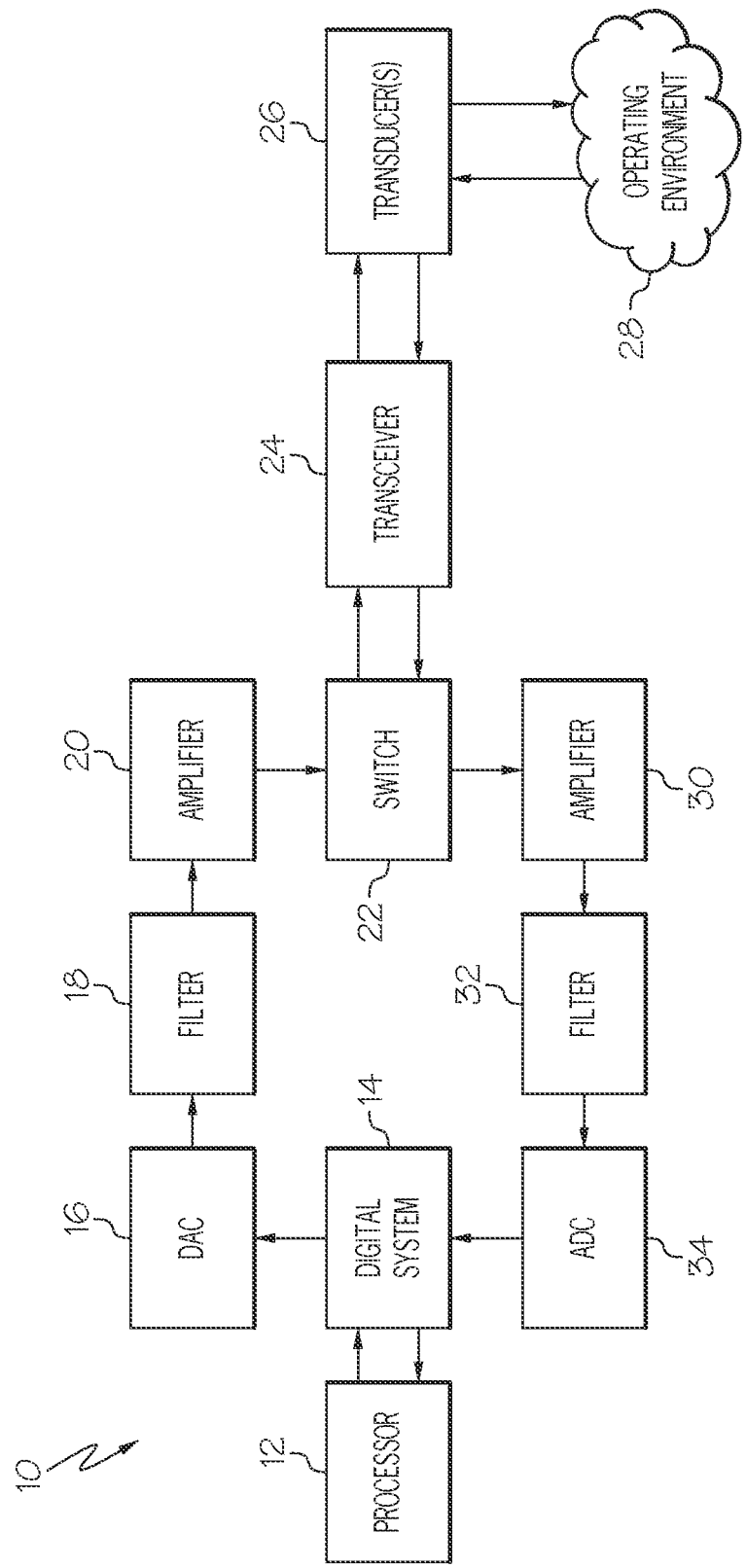
FIG. 1 shows a block diagram of an embodiment of system in accordance with the Software-Defined Acoustic Communications System.

FIG. 1 shows a block diagram of an embodiment of the system design for a system 10 in accordance with the Software-Defined Acoustic Communications System. As shown in FIG. 1, system 10 is configured as a communications system that provides transmit/receive capabilities. As an example, system 10 may be implemented into a buoy as part of an inexpensive, extensive, and highly modular sensor/communication network, or into a manned or unmanned surface or sub-surface vessel to provide ACOMMS capability. As an example, system 10 is shown with transducer(s) 26, which are used in an underwater operating environment 28. However, system 10 may be configured to operate in an air-based operating environment using an antenna connected to transceiver 24.

System 10 includes a processor 12 operatively connected to a digital system 14. In some embodiments, processor 12 is an embedded processor. As an example, a low-power Linux platform may be used to implement the user interface, program encapsulation, and high-level processing. As another example, processor 12 may comprise an ARM Cortex A8 processor operating at 1 GHz.

Digital system 14 may, for example, comprise a field-programmable gate array (FPGA) or microcontroller. When in transmit mode, processor 12 sends a signal to digital system 14. Digital system 14 is configured to, via a high-speed connection, send a digital signal to a digital-to-analog converter (DAC) 16. As an example, DAC 16 comprises a two 14-bit Analog to Digital (A/D) converter channel with 150 MSPS. DAC 16 is configured to convert the digital signal into an analog signal and send the converted signal to filter 18, which filters the signal and outputs the signal to amplifier 20.

Amplifier 20 amplifies the received signal. In some embodiments, amplifier 20 is a three-stage power amplifier. As an example, such a power amplifier may have characteristics including a 0.1 dB max gain deviation, a wide operational bandwidth from 1 kHz to 250 kHz, a 171 dB re 1 uV output level, variable gain capability, a signal-to-noise ratio (SNR) over 100 dB, a 50V/us slew rate, and a digitally controlled shutdown/sleep capability. Amplifier 20 then sends the amplified signal to switch 22.

Switch 22 provides the ability for system 10, which as shown only one or more transducers 26, to operate in half-duplex mode (i.e. bi-direction, non-simultaneous communication). Switch 22 is designed to consume zero power in receive mode. In transmit mode, switch 22 may be configured to be very power efficient, only consuming, for example, 150 mW of power. In some embodiments, digital system 14 controls the state of switch 22 and whether system 10 is in transmit or receive mode. In transmit mode, switch 22 is configured to receive signals from amplifier 20 and direct the signals to a transmit module (see FIG. 8) within transceiver 24. Transceiver 24 then directs the signals to transducer(s) 26 (or an antenna if used), which transmit the signals within the particular operating environment 28 to a desired target location. In some embodiments where multiple transducers are used, such transducers may be paired with multiple DACs/ADCs to form sets with different frequency bands that seamlessly work together as a single logical transducer with a wider overall bandwidth.

When in receive mode, system 10 receives signals from operating environment 28 via transducer(s) 26 (or an antenna if used). The received signals are sent to a receive module (see FIG. 8) transceiver 24, to switch 22, which directs the received signals to an amplifier 30. The received signals may then be amplified by amplifier 30, filtered by filter 32, and then sent to analog-to-digital converter (ADC) 34. ADC 34 converts the analog signals into digital signals and routes, via a high-speed connection, the digital signals to digital system 14. As an example, ADC 34 comprises a two 14-bit Digital to Analog (D/A) converter channel with 250 MSPS. In some embodiments, digital system 14 is configured to perform processing on the received signals and send the signals to processor 12.

As an example, the components of system 10 may be designed to operate between a frequency range of 10 kHz and 250 kHz. It should be recognized however, that the actual operating frequency may vary and may be dependent, upon the particular transducer(s) 26 used and other components selected for system 10.

In some embodiments, a receiver component of transceiver 24 may include a three-stage analog signal conditioner. A first stage may involve buffering and pre-amplification using small-value resistors and parallel sections to reduce noise contributions. A second stage may involve a negative-feedback operational amplifier and output buffering. A third stage may involve a modular passive band pass filter (BPF). In some embodiments, the BPF is an adjustable BPF and has a digitally controlled gain of between 48 dB and 82 dB. As an example, the circuitry of such a receiver component may be designed to provide a less than 3 dB noise figure, low power operation with shutdown/sleep capability, and wide operational bandwidth from 10 kHz to 250 kHz.

System 10 may be configured with the appropriate software modules to perform the functions as discussed herein. As an example, processor 12 and/or digital system 14 may have such modules stored therein. The modules may either function alone or in concert with processor 12 and/or digital system 14, or with other devices or components of system 10. Such modules may be utilized separately and/or together locally and/or remotely to form a program product thereof. Any of the methods or protocols described herein may be implemented as a program product comprised of a plurality of such modules, which can be interactively displayed for a user on a display screen of a data-processing system (e.g., computer). Such interactivity may be provided by a specialized graphical user interface (not shown).

The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof.

As an example, for illustrative purposes, the modules will be discussed with reference to being implemented into processor 12 and/or digital system 14 or memory contained within or accessible to processor 12 and/or digital system 14. Processor 12 and/or digital system 14 may be configured to run various programs including a user interface and a set of main modules. As an example, the user interface may be a simple front-end command line interface with straightforward customization options. The user may connect to the Linux system via SSH over Ethernet and select general transmission parameters such as modulation scheme, operating frequency and bandwidth, and sent/received data options. The design may be simple and straightforward, but deeply customizable. In some embodiments, a web-based configuration and control interface may be used, which may be connected via Ethernet.

The main modules allow for devices and capabilities to be easily enabled/disabled without rebooting the system or recompiling the source code. Processor 12 may contain a set of core modules therein configured to oversee the activity and direct signal flow. One such module may be a signal manager module. This module manages the overall system configuration, codec choices, and flow of signals at the software layer for both transmit and receive. The signal manager module helps provide the ability to easily switch modulation schemes, allowing for many application-specific configurations from a unified device. In ACOMMS mode for example, the user has the option to select from modulation schemes as discussed below. The signal manager module may also provide capability for the selection and configuration of receiver functions, such as channel and Doppler estimation, and optional signal processing functions such as forward error correction (channel coding), data compression, and encryption.

The signal manager module may also be configured to specify the source and sink (destination) of the data being transmitted and received by system 10, such as data files or real-time Ethernet data streams. For example, if a user specifies that spread-spectrum signals with Turbo coding will be used to encode real-time data from User Datagram Protocol (UDP) packets, that transceiver 24 will use channel and Doppler estimation, and that the received data will be saved to file, then the signal manager module will define and configure all of the modules corresponding to these signal processing functions and their interconnections.

Processor 12 may further implement a system monitor module. For operational oversight, the system monitor module may initially launch all modules as specified by the system configuration generated by the signal manager module, and ensure that all program modules are continuously synchronized and functional. This may be achieved by periodically interrogating the status of the modules. Errors and messages from other programs may be passed to the system monitor module.

Processor 12 may further implement various signal processing modules. Such signal-processing modules will encapsulate each algorithm and modulation scheme implemented on system 10, as well as each possible data sink and source. These modules will form the building blocks of system 10. An initial library of essential signal processing modules may be incorporated into system 10, implementing common functions such as BPSK, QPSK, MFSK, spread-spectrum, convolutional coding, channel estimation, and a file source and sink. System 10 may further include signal processing modules involving more complex functions such as M-ary orthogonal spread-spectrum, Turbo codes, Lempel-Ziv compression, Advanced Encryption Standard (AES) encryption, and a UDP source and sink.

In some embodiments, processor 12 and/or digital system 14 may implement a software module that is configured to reconfigure the operating frequency of digital system 14 based upon the operating frequency of transducer(s) 26. As an example, if a transducer 26 having a particular operating frequency is used, the software may determine the operating frequency and cause processor 12 and/or digital system 14 to reconfigure the operating frequency accordingly.

The operating frequency, or center frequency and bandwidth, of processor 12, digital system 14, and the analog electronic components, including filter 18, amplifier 20, amplifier 30, and bandpass filter 32, should all be configured according to the operating frequency of the transducer in order to achieve the most optimal performance of the overall system. As an example, the operating frequency is configured by the end user through a user interface on processor 12, either directly or by selecting the transducer make and model from a list of known transducers, for which processor 12 already has this information stored therein or accessible thereto.

Processor 12 uses the center frequency and bandwidth of the transducer to adjust signal modulation parameters, including the carrier frequency, signal bandwidth, and passband sample rate. The signal bandwidth and passband sample rate information is then passed from processor 12 to digital system 14, which adjusts these parameters of the generated signals. Digital system 14 also makes adjustments to filter 18, amplifier 20, amplifier 30, and bandpass filter 32 according to the signal bandwidth. In some implementations and embodiments of the system, multiple instances of analog electronic filter 18 and bandpass filter 32, each designed for different bandwidth ranges, may exist concurrently and be selected from and configured to specific bandwidths via control signals from digital system 14, according to the operating frequency of the transducer.

In some embodiments, the operating frequencies (center frequency and bandwidth) of the transducer(s), are entered manually by the end user, as a configuration setting, through a user interface on processor 12. This setting would then be passed from processor 12 to the digital system 14, which would configure the analog electronic components, including filter 18, amplifier 20, amplifier 30, and bandpass filter 32, according to the frequency settings.

A more user-friendly design, such as one which determines the operating frequencies based on the model of the transducer and a stored lookup table may also be implemented. In such embodiments, the end user would minimally have to enter the make and model of the transducer as a configuration setting through a user interface on processor 12. Such embodiments may incorporate a means or protocol for providing transducer identification information (e.g. make, model, and/or operating frequency) electroncially to a microprocessor.

In some embodiments, processor 12 and/or digital system 14 may implement a software module that involves a generalized protocol, such as an XML-based protocol, that allows for configuration of as many parameters of system 10 as possible.

In some embodiments, system 10 is configured, via the appropriate software modules within processor 12 and/or digital system 14, along with the appropriate associated hardware, to probe and scan for a range of possible frequency bands, communication protocols, data rates, and other parameters. Once this information is obtained, system 10 may then be configured to pass this information to a remote computing site that could process the probe and scan results to determine as much information as possible, including but not limited to the center frequency, bandwidth, and modulation scheme, about other unknown communication systems that may exist in the operating environment. As an example, if a direct sequence spread spectrum scheme is determined to be used by an unknown communications system, system 10 could further estimate parameters of that scheme, such as spreading length and spreading sequence. After estimating such, and other, parameters of the unknown communications system, system 10 could be configured to communicate with such system using, for example, the same modulation scheme as the unknown system.

In some embodiments, system 10 is configured, via the appropriate software modules within processor 12 and/or digital system 14, to self-configure together with other systems within or outside of the operating environment to negotiate communication parameters, including but not limited to a common bandwidth, modulation scheme, and data rate of communication.

In some embodiments, processor 12 and/or digital system 14 may implement a software module that involves a synchronization protocol is not detectable by anyone or any system except the targeted system. Such a protocol could be based, for example, on pseudorandom signals.

In some embodiments, an application programming interface (API) is provided to end users, enabling them to develop, implement, test, and refine new and innovative signal processing algorithms as modules on system 10. Such an API saves the end user time and money and allows for protection of information without the need to work through outside entities that control the programming and modification of their particular system. As part of the API, the user may interact with system 10 in software and hardware to achieve the desired use. Software configuration allows for a range of uses including bi-directional communications and simple audio recording. Hardware configuration allows for different frequency-response characteristics.

Configurable software allows a user to be presented with a set of general options including, but not limited to, record audio, transmit audio, and ACOMMS. Once the desired mode is selected, it may be configured. The record and transmit audio options are relatively straightforward and little configuration may be available. However, ACOMMS, the main component, may be deeply configurable.

Figure 2:
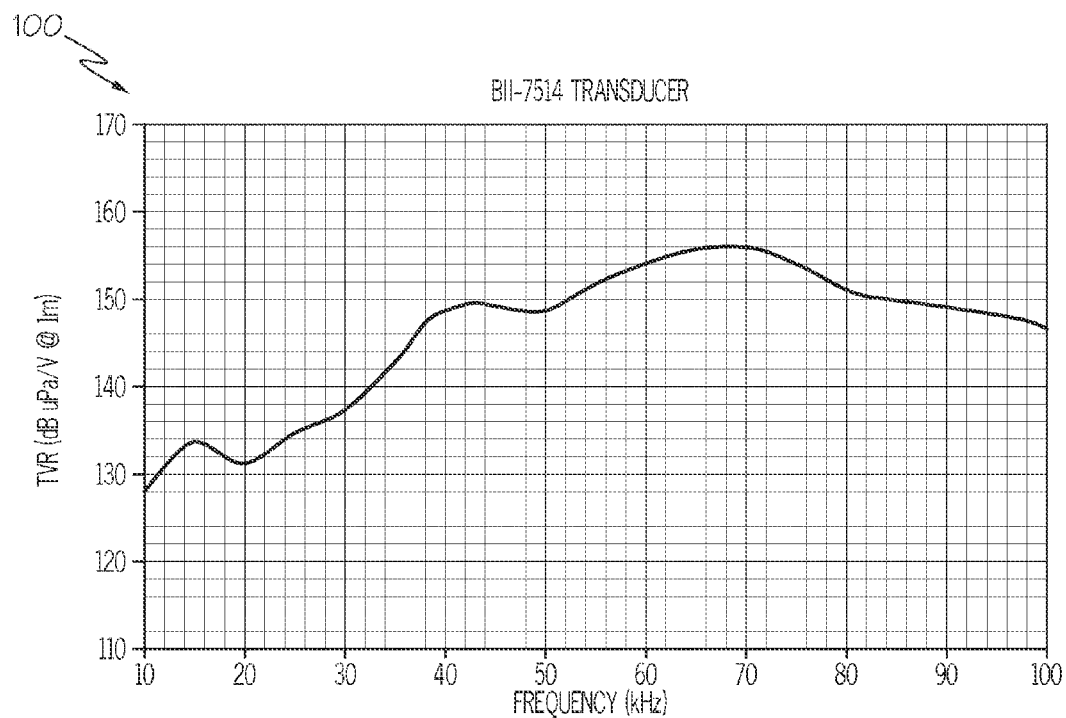
FIG. 2 shows a graph illustrating the transmitting voltage response versus frequency for an exemplary transducer for use within an embodiment of a system in accordance with the Software-Defined Acoustic Communications System.
Figure 3:
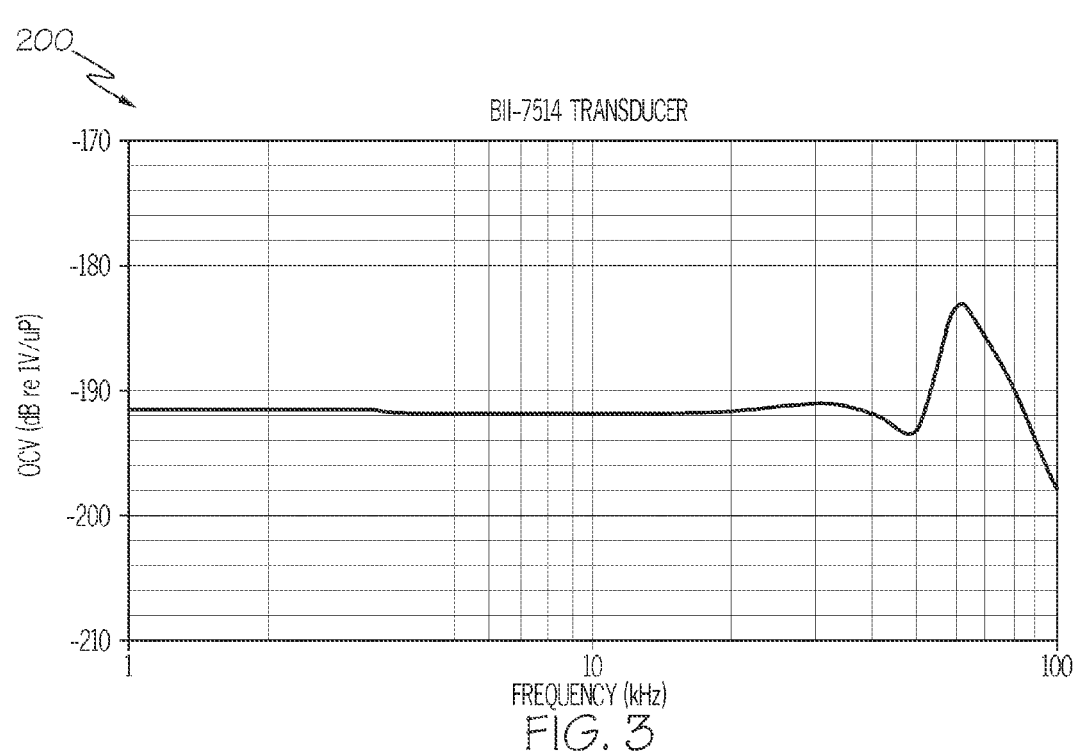
FIG. 3 shows a graph illustrating the open circuit voltage receiving sensitivity versus frequency for an exemplary transducer for use within an embodiment of a system in accordance with the Software-Defined Acoustic Communications System.

As an example, a primary modular hardware component is transducer 26. The physical characteristics of each transducer makes it suited for specific frequencies of operation. FIG. 2 shows a graph 100 illustrating the transmitting voltage response versus frequency for an exemplary transducer for use within an embodiment of a system, such as system 10, in accordance with the Software-Defined Acoustic Communications System, while FIG. 3 shows a graph 200 illustrating the open circuit voltage receiving sensitivity versus frequency for an exemplary transducer. The fixed receiver hardware of some embodiments allows for a variety of transducers 26 to be used.

An analysis was performed to determine signal loss, channel capacity, and the required source level to achieve a given SNR. All of these characteristics were calculated as a function of range and frequency. For a system 10 configured to operate in seawater, transmission loss (TL) in seawater is determined according to $$TL=20*\log 10(R)+\alpha*R \quad (\text{Eq. 1})$$

where $\alpha$ is the absorption coefficient of seawater, which is a function of frequency and ocean chemistry.

Figure 4:
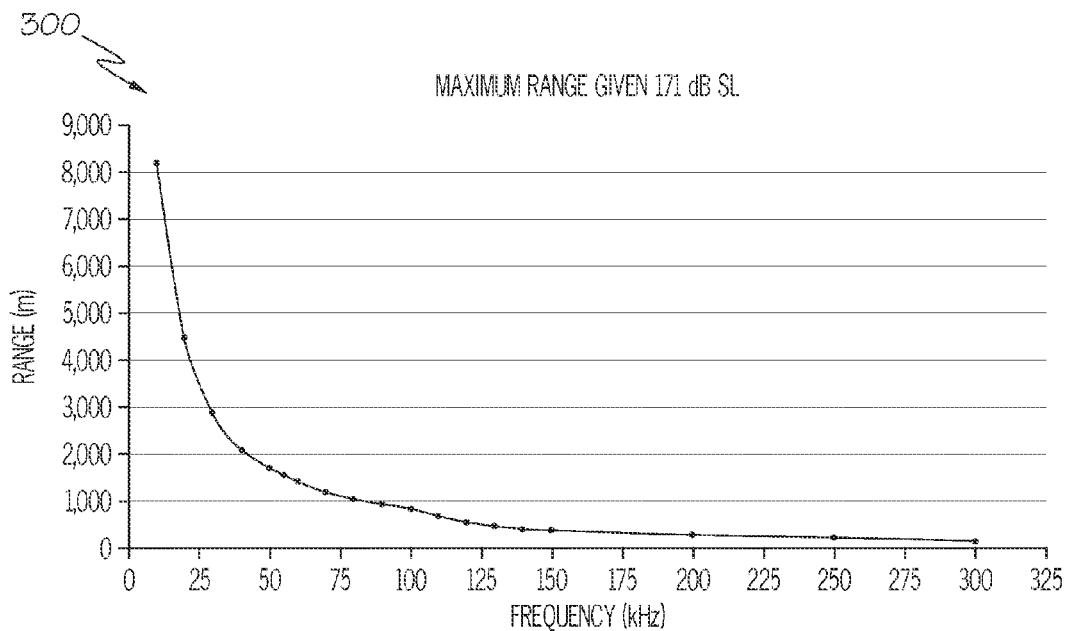
FIG. 4 shows a graph illustrating the maximum range versus operating frequency for a given signal level for an embodiment of a system in accordance with the Software-Defined Acoustic Communications System.
Figure 5:
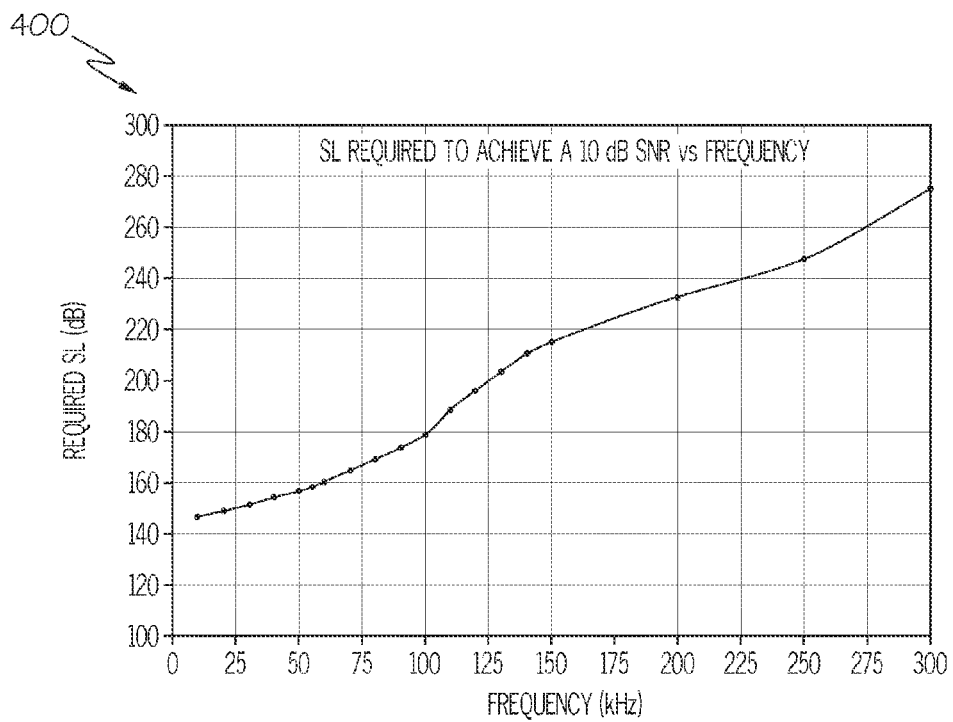
FIG. 5 shows a graph illustrating the minimum signal level to achieve a given receiver signal-to-noise ratio over a range of frequencies for an embodiment of a system in accordance with the Software-Defined Acoustic Communications System.

FIG. 4 shows a graph 300 illustrating the maximum range versus operating frequency for an embodiment of a system, such as system 10, in accordance with the Field-Programmable Software-Defined Acoustic Communications System, given a minimum required signal level for communication. A required signal level (SL) may be determined according to $$SL=SNR+TL+NL \quad (\text{Eq. 2})$$

where NL is the ambient noise level at operating frequency. FIG. 5 shows a graph 400 illustrating the minimum signal level to achieve a given receiver signal-to-noise ratio for an embodiment of a system, such as system 10, in accordance with the Software-Defined Acoustic Communications System.

Figure 6:
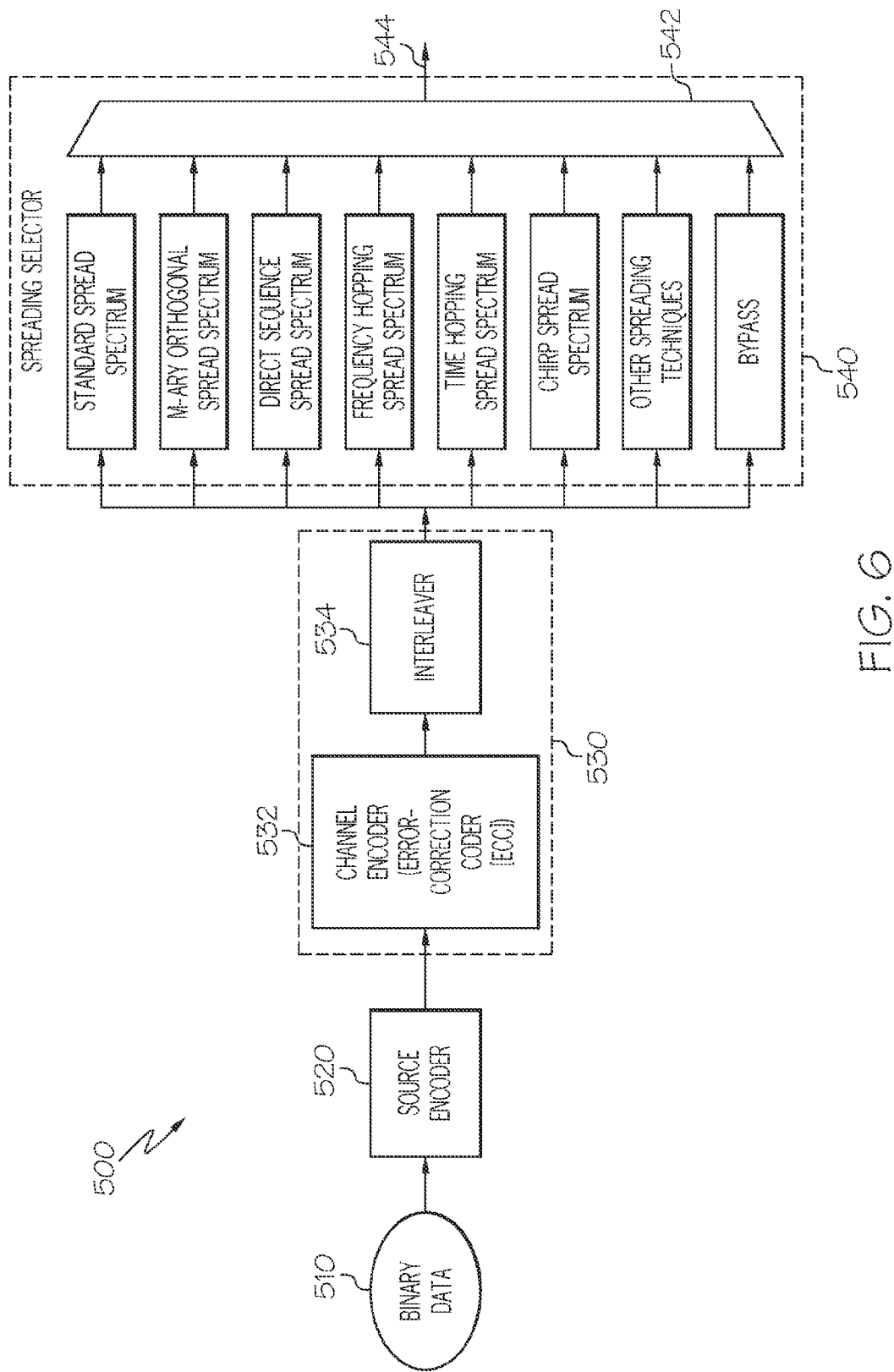
FIGS. 6 and 7 show block diagrams of an embodiment of waveform generation components for use in a system in accordance with the Software-Defined Acoustic Communications System.
Figure 7:
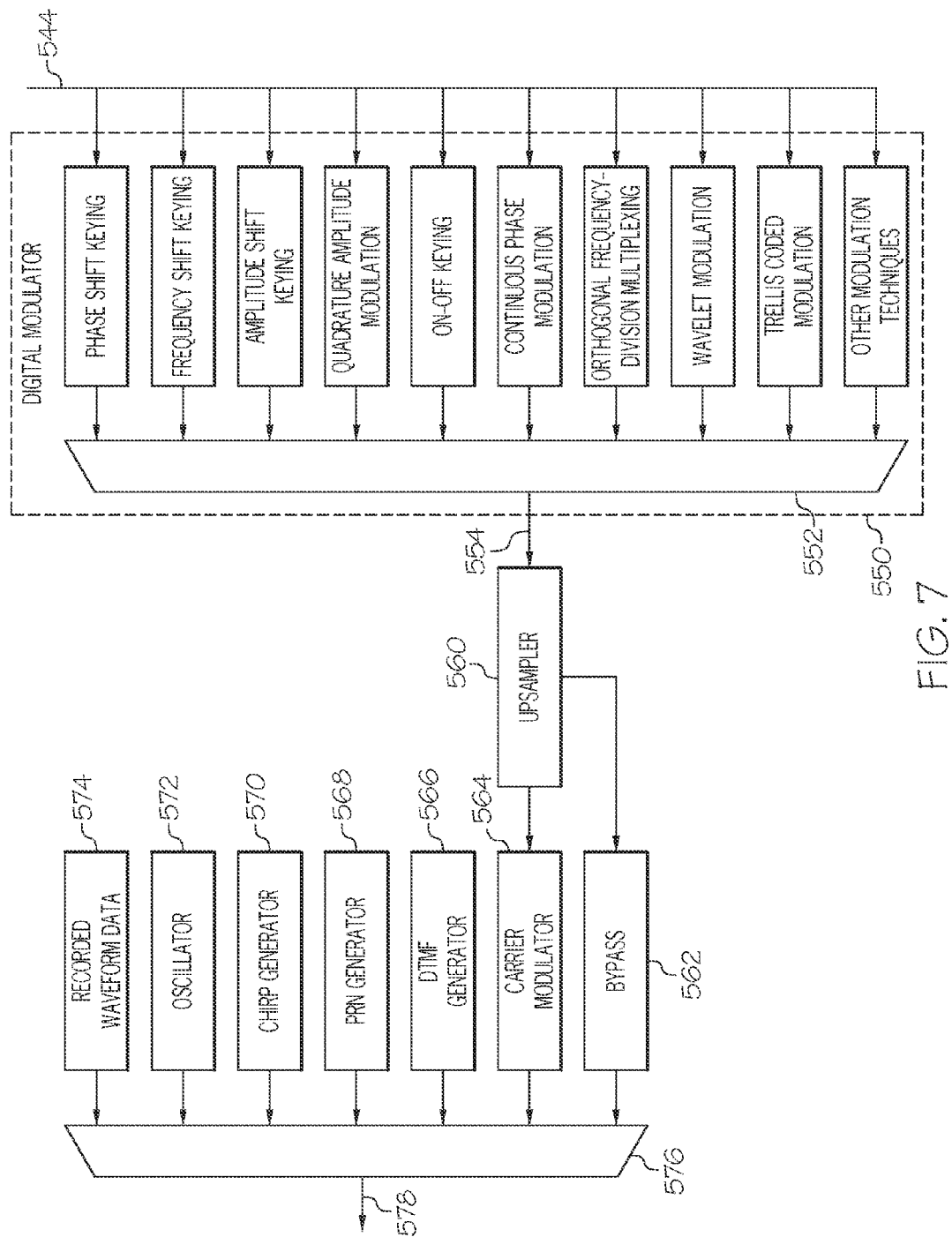

FIGS. 6 and 7 show block diagrams of an embodiment 500 of waveform generation components for use in a system in accordance with the Software-Defined Acoustic Communications System. As an example, some or all of the components shown may be implemented as software modules that are stored within and processed by processor 12. In operation, binary data 510 is input into and encoded by source encoder 520, which applies a data compression algorithm such as Lempel-Ziv or Huffman. Encoder 520 outputs a binary stream of data into box 530, the channel encoder and interleaver system. Box 530 consists of channel encoder 532 and interleaver 534.

Channel encoder 532 applies a user-selected error correction code to the bit stream, such as turbo code, low-density parity check, or Reed-Soloman, while interleaver 534 compliments the performance of the error correction code by mitigating the effects of bursty channel errors. While in some embodiments the error correction code is user-selected, in some embodiments software may be used to intelligently select the best error correction code based upon the current operating environment and/or other user-determined operating parameters.

Box 540 involves selection of a spreading code, such as standard spread spectrum, M-ary orthogonal spread spectrum, direct sequence spread spectrum, frequency hopping spread spectrum, time hopping spread spectrum, chirp spread spectrum, or a bypass of spreading. However, it should be recognized by a person having ordinary skill in the art that other types of spreading codes may be used within the system. After the selection is made at box 542, an output signal 544 is then sent to a digital modulator 550 shown in FIG. 7.

At digital modulator 550, a modulation method, such as but not limited to, phase shift keying, frequency shift keying, amplitude shift keying, quadrature amplitude modulation, on-off keying, continuous phase modulation, orthogonal frequency division multiplexing, wavelet modulation, and trellis coded modulation, is selected at box 552. In some embodiments, the selection is performed by the end user. In some embodiments software may be used to intelligently select the modulation method based upon the current operating environment. An ouput signal 554 is then sent to an upsampler 560.

Upsampler 560 upsamples the signal from a baseband to passband sample rate, such as by a factor of thirty-two. The signal is then either sent as is via bypass 562 or carrier modulated by carrier modulator 570. In some embodiments, the user might desire to generate another passband signal for transmit, including but not limited to a DTMF signal from DTMF generator 566, a PRN signal from PRN generator 568, a chirp signal from chirp generator 570, an signal from an oscillator 572, and/or a recorded waveform from recorded waveform data 574, and can do so at the signal generator and carrier modulator. The signals are combined at box 576 and the output signal 578 is sent to digital system 580 as shown in FIG. 8.

Figure 8:
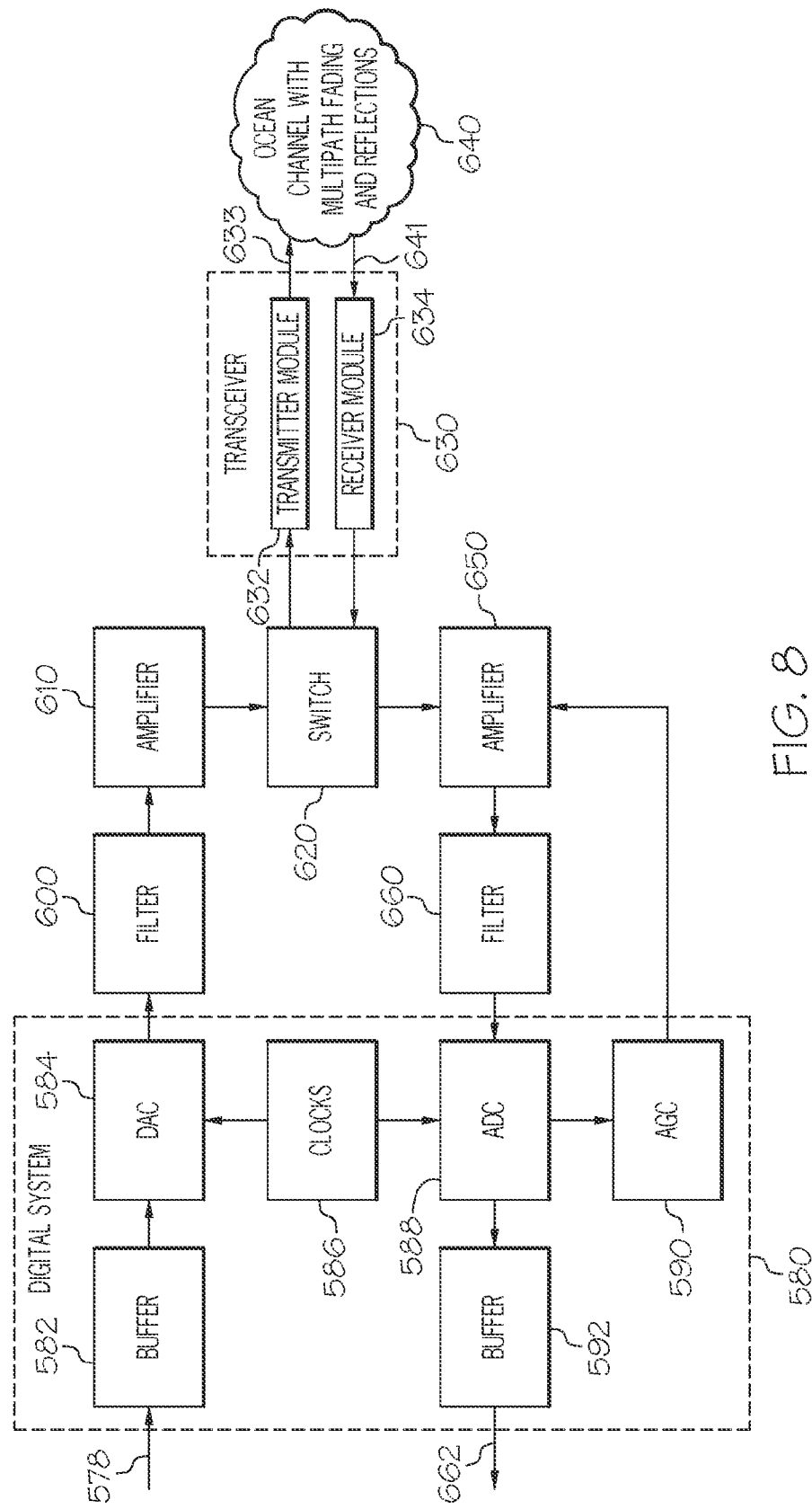
FIG. 8 shows a block diagram of an embodiment of signal processing components for use in a system in accordance with the Software-Defined Acoustic Communications System.

FIG. 8 shows a block diagram of an embodiment of signal processing components for use in a system in accordance with the Software-Defined Acoustic Communications System. As an example, some of the components may be implemented as software modules that are stored within and processed by digital system 14, while other components comprise hardware components. In operation, signal 578 is received by a transmitting subset of digital system 580, which corresponds to digital system 14 shown in FIG. 1, which may include a buffer 582 and DAC 584, which corresponds to DAC 16 shown in FIG. 1. Buffer 582 outputs the signal to DAC 584, which utilizes a reference clock 586.

The output of DAC 584 is then filtered by filter 600, and sent to amplifier 610 for amplification to a desired signal level. After amplification, the signal is sent to the switch 620, which is also shown in FIG. 1 as switch 22. Switch 620 controls the state of the transceiver 630. Transceiver 630, which is also shown in FIG. 1 as transceiver 24, includes a transmitter module 632 and a receiver module 634, with switch 620 controlling whether the signals are outputted or inputted from transceiver 630.

When in transmit mode, transmitter module 632 outputs the generated waveform 633 to, using an example of underwater environments, ocean channel 640, which may contain multipath fading and reflections. When in receive mode, receiver module 634 receives a signal 641 from ocean channel 640, which by using switch 620, is sent to amplifier 650 for amplification and further filtered by filter 660, which may, for example, be an anti-aliasing and/or band-pass filter). It should be noted that filters 600 and 660 correspond to filters 18 and 32 shown in FIG. 1, while amplifiers 610 and 650 correspond to amplifiers 20 and 30 as shown in FIG. 1.

The processed signal is then sent to a receiving subset of the digital system 580. At the receiving digital sub-system of digital system 580, the signal is converted from analog to digital by ADC 588, which corresponds to ADC 34 shown in FIG. 1, which utilizes the reference clock 586. The digital signal is sent to automatic gain control 590 and a memory buffer 592. The output signal 662 from memory buffer 592 is passed to processor 12 for further processing.

Figure 9:
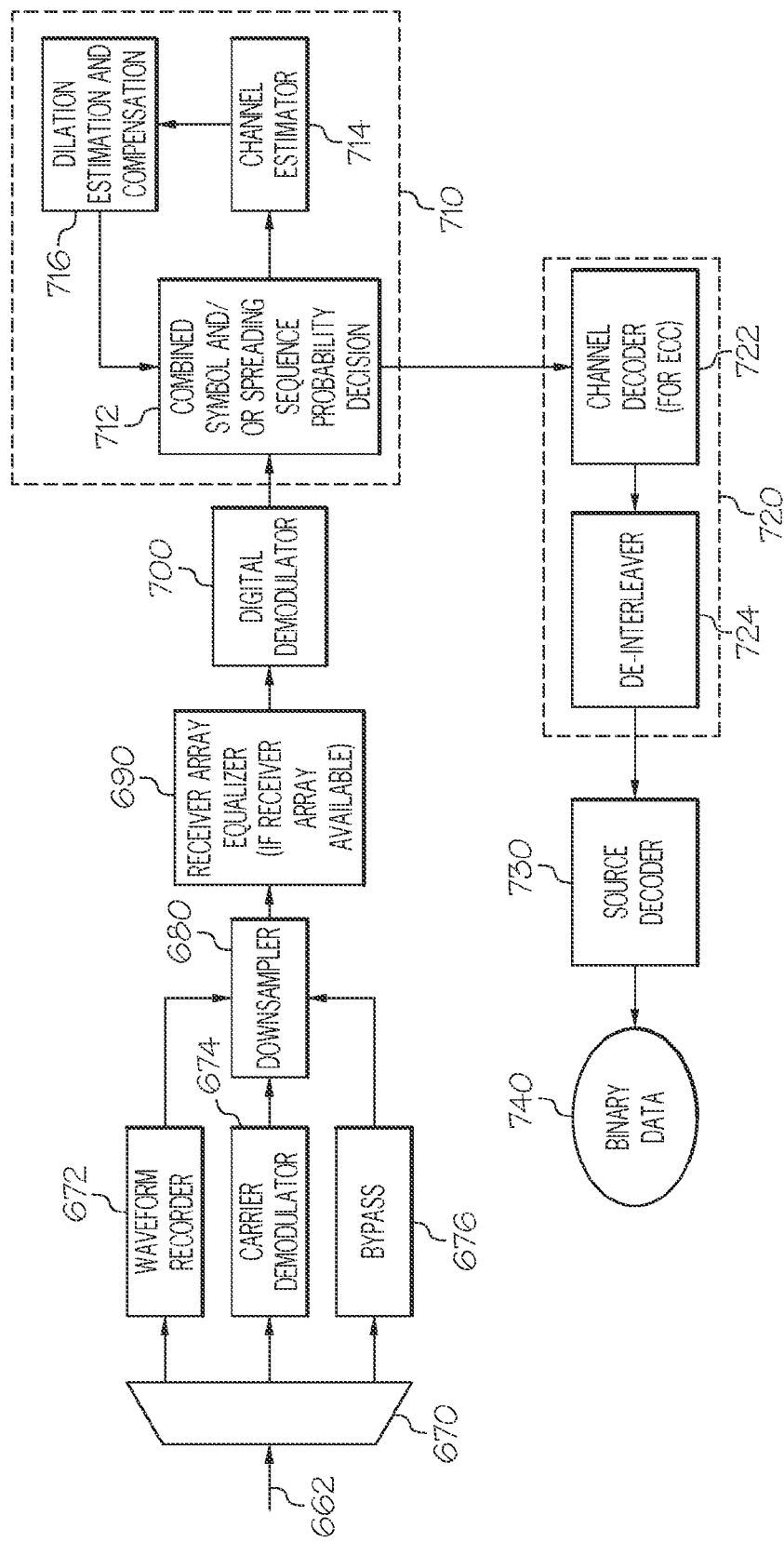
FIG. 9 shows a block diagram of an embodiment of receiver components for use in a system in accordance with the Software-Defined Acoustic Communications System.

FIG. 9 shows a block diagram of an embodiment of receiver components for use in a system in accordance with the Software-Defined Acoustic Communications System. As an example, some or all of the components may be implemented as software modules that are stored within and processed by processor 12 and/or digital system 14. In operation, a signal 662 is received from signal processing component shown in FIG. 8 and buffered by buffer 670. The signal could then be recorded by a waveform recorder 672, demodulated by carrier demodulator 674, or bypassed at box 676 and passed on to downsampler 680 for downsampling. The output of the downsampler 680 may then be equalized by receiver array equalizer 690.

The output from equalizer 690 is sent to digital demodulator 700 and the demodulated signal is sent to box 710, which includes the combined symbol and/or spreading sequence probability decision module 712, the channel estimator 714, and dilation estimator 716. The output of the combined symbol and/or spreading sequence probability decision module 712 is then processed by error correction code module 720, which includes channel decoding by channel decoder 722 and de-interleaving by de-interleaver 724. The resulting signal is sent to source decoder 730, which decompresses and outputs the received binary data 740.

Many modifications and variations of the Software-Defined Acoustic Communications System are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system comprising:
   at least one transducer configured to transmit signals into and receive signals from an operating environment;
   a transceiver connected to the transducer, the transceiver having a transmitter module and a receiver module therein, wherein the transmitter module directs signals to be transmitted to the transducer for transmission into the operating environment and the receiver module receives signals from the transducer that were received by the transducer from the operating environment;
   a switch connected to the transceiver;
   a first and a second amplifier connected to the switch;
   a first filter connected to the first amplifier and a bandpass filter connected to the second amplifier;
   a digital-to-analog converter (DAC) connected to the first filter and an analog-to-digital converter (ADC) connected to second filter;
   a digital system connected to both the DAC and ADC, wherein the digital system is one of a field programmable gate array (FPGA) processor and a micro-controller; and
   a processor connected to the digital system, wherein at least one of the digital system and the processor has a plurality of software modules stored therein, wherein an operating frequency of the at least one transducer is entered by an end user into the processor through a user interface, wherein the processor is configured to provide the operating frequency of the at least one transducer to the digital system, wherein a software module within the digital system configures the first amplifier, the second amplifier, the first filter, and the bandpass filter according to the operating frequency of the at least one transducer, wherein the system is configured, via one or more of the software modules, to probe and scan the operating environment for a range of possible frequency bands, communication protocols, data rates, and other parameters, to determine a center frequency, a bandwidth, and a modulation scheme about other unknown communication systems.

2. The system of claim 1, wherein the at least one transducer is a plurality of transducers.

3. The system of claim 2, wherein each transducer of the plurality of transducers has a different operating frequency band.

4. The system of claim 1, wherein one of the software modules is configured to reconfigure a modulation method used by the digital system based upon conditions within the operating environment.

5. A system comprising:
   at least one transducer configured to transmit signals into and receive signals from an operating environment;
   a transceiver connected to the transducer, the transceiver having a transmitter module and a receiver module therein, wherein the transmitter module directs signals to be transmitted to the transducer for transmission into the operating environment and the receiver module receives signals from the transducer that were received by the transducer from the operating environment;
   a switch connected to the transceiver;
   a first and a second amplifier connected to the switch;
   a first filter connected to the first amplifier and a bandpass filter connected to the second amplifier;
   a digital-to-analog converter (DAC) connected to the first filter and an analog-to-digital converter (ADC) connected to second filter;
   a digital system connected to both the DAC and ADC, wherein the digital system is one of a field programmable gate array (FPGA) processor and a micro-controller; and
   a processor connected to the digital system, wherein at least one of the digital system and the processor has a plurality of software modules stored therein, wherein an operating frequency of the at least one transducer is entered by an end user into the processor through a user interface, wherein the processor is configured to provide the operating frequency of the at least one transducer to the digital system, wherein a software module within the digital system configures the first amplifier, the second amplifier, the first filter, and the bandpass filter according to the operating frequency of the at least one transducer, wherein the system is configured, via one or more of the software modules, to self-configure together with other communication systems to negotiate a common bandwidth, a modulation scheme, and a data rate of communication.

6. The system of claim 5, wherein the at least one transducer is a plurality of transducers.

7. The system of claim 6, wherein each transducer of the plurality of transducers has a different operating frequency band.

8. The system of claim 5, wherein one of the software modules is configured to reconfigure a modulation method used by the digital system based upon conditions within the operating environment.

* * * * *